(12) United States Patent
Frazier et al.

(10) Patent No.: US 9,211,831 B2
(45) Date of Patent: Dec. 15, 2015

(54) APPARATUS TO DEPLOY A LIFTGATE FULLY CONTAINED WITHIN A CARGO SPACE AND METHOD

(71) Applicants: John Frazier, Shadow Hills, CA (US); Ross Joseph Young, San Marcos, CA (US)

(72) Inventors: John Frazier, Shadow Hills, CA (US); Ross Joseph Young, San Marcos, CA (US)

( * ) Notice: Subject to any disclaimer, the term of this patent is extended or adjusted under 35 U.S.C. 154(b) by 0 days.

(21) Appl. No.: 14/120,855

(22) Filed: Jul. 2, 2014

(65) Prior Publication Data

US 2015/0147144 A1    May 28, 2015

Related U.S. Application Data

(60) Provisional application No. 61/957,699, filed on Jul. 10, 2013.

(51) Int. Cl.
| | |
|---|---|
| *B60P 1/44* | (2006.01) |
| *B60P 1/43* | (2006.01) |
| *B60P 1/02* | (2006.01) |

(52) U.S. Cl.
CPC . *B60P 1/43* (2013.01); *B60P 1/022* (2013.01); *B60P 1/4421* (2013.01); *B60P 1/4442* (2013.01); *B60P 1/4492* (2013.01)

(58) Field of Classification Search
CPC ...... B60P 1/022; B60P 1/4421; B60P 1/4442; B60P 1/4485

USPC ......................................... 414/541, 545, 679
See application file for complete search history.

(56) References Cited

U.S. PATENT DOCUMENTS

| | | | | | |
|---|---|---|---|---|---|
| 3,454,171 | A | * | 7/1969 | Lundahl | 414/305 |
| 4,548,542 | A | * | 10/1985 | Reese | 414/549 |
| 5,651,657 | A | * | 7/1997 | Poindexter | 414/541 |
| 7,306,421 | B2 | * | 12/2007 | Wolfe | 414/541 |
| 8,398,358 | B2 | * | 3/2013 | L'Ecuyer | 414/549 |
| 8,657,554 | B1 | * | 2/2014 | Pritchard | 414/541 |
| 2007/0166140 | A1 | * | 7/2007 | Warthan | 414/498 |

* cited by examiner

*Primary Examiner* — James Keenan
(74) *Attorney, Agent, or Firm* — Brandon K. Braga

(57) ABSTRACT

An apparatus and a method that deploys a liftgate from the cargo space of a contained area is described. In one embodiment the device has an anchor frame permanently attached to the inside of a cargo space and a front linkage member and a rear linkage member pivotably attached to the anchor frame. An actuator is pivotably attached on one end to the rear linkage member and to the anchor frame on the other end. The front and rear linkage bars are further attached on the opposite ends to a mounting member, which is attached to a liftgate. In a nested state the liftgate is stored and locked in a horizontal position above the apparatus. In an engaged state, the front linkage member and rear linkage member rotate and the mounting member translates and rotates through the cargo door opening to reposition the liftgate in a functional position outside of the cargo space.

4 Claims, 3 Drawing Sheets

APPARATUS TO DEPLOY A LIFTGATE FULLY CONTAINED WITHIN A CARGO SPACE AND METHOD

CROSS-REFERENCE TO RELATED APPLICATION

This application claims the benefit of priority to U.S. provisional patent application Ser. No. 61/957,699 filed Jul. 10, 2013.

FIELD OF THE INVENTION

The invention relates to an apparatus and method for deploying a liftgate wherein the liftgate is fully enclosed in a container space.

BACKGROUND OF THE INVENTION

For decades, cargo containers have been the standard method of transferring products, equipment and supplies across bodies of water, roads and railways. Transportation practicalities—namely stackability of the containers—mandate that all of the contents of cargo containers be contained within the containers walls.

More recently, individuals and companies utilize cargo containers as portable workshops or dedicated storage units for their expendables and supplies for temporary fieldwork. The obvious benefits of using cargo containers for fieldwork stations are portability, ample workspace and an inexpensive means of transportation to and from the field location. Often, the containers are left on the transportation vehicle during their temporary deployment. In these situations, all supplies, equipment, and any stored products, must be removed from the container and lowered to the ground level. Additional equipment, such as forklifts, must be obtained and utilized to unload the contents of the container.

A more practical method of unloading would be to have a permanently mounted apparatus inside the container that aids in unloading the contents of the container. The present invention is an apparatus and a method of deploying a liftgate that is fully enclosed within the cargo space of a container such that when in the nested position the liftgate will still allow access to the cargo area and when in the fully deployed position is outside the cargo space and fully functional.

BRIEF SUMMARY OF THE INVENTION

The present invention can be embodied as a device or method of deploying a liftgate that is fully enclosed within the cargo space of a container. In the nested state a liftgate is attached to a mounting member. The mounting member is attached at a pivotal connection by a front linkage member and a rear linkage member; both linkages are further attached at a pivotal connection to dual anchor frames fixed to the container. The anchor frame includes a front and rear support member connected by a series of members and plates having a pivotal connection points for the front and rear linkages and actuator. An actuator is attached to a pivotal connection on the rear support member of the frame and the rear linkage member.

Upon deployment of the actuator the cylinder rods extend and apply force to the rear linkage member. The rear linkage member and front linkage member simultaneously rotate downward, deploying the liftgate from a nested position to a deployed position. When the cylinder rod is fully extended the apparatus is in a fully deployed position. At that point the liftgate is positioned outside of the cargo space and is locked in a functional position. Upon retracting the actuator, the rear linkage member and front linkage member simultaneously rotate upward, returning the liftgate to its nested and locked position.

DESCRIPTION OF THE DRAWINGS

For a fuller understanding of the nature and objects of the invention, reference should be made to the following detailed description taken in conjunction with the accompanying drawings, in which.

DETAILED DESCRIPTION OF THE INVENTION

Figure 1:
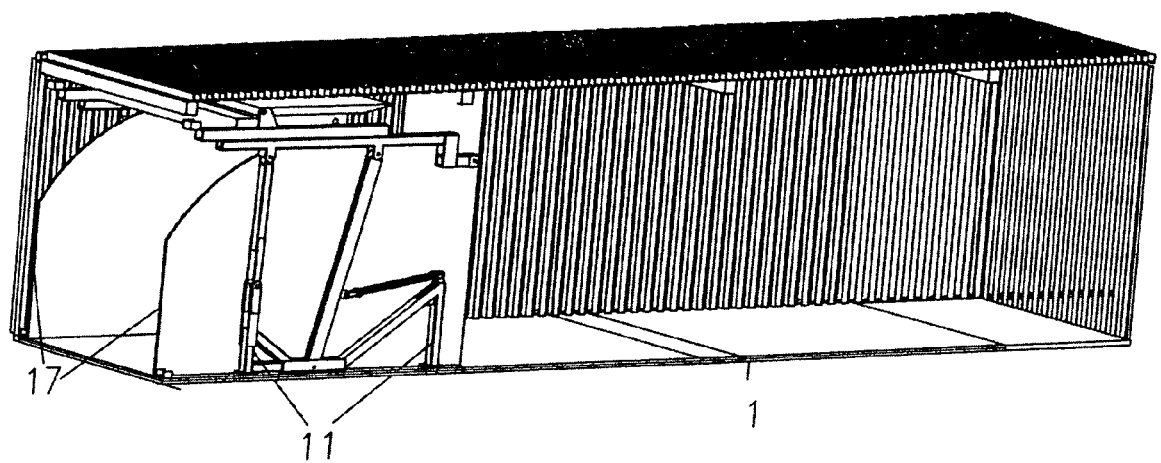
FIG. 1 depicts the invention enclosed in a container with one container wall and the container door removed, wherein the invention is in a retracted and locked position.
Figure 2:
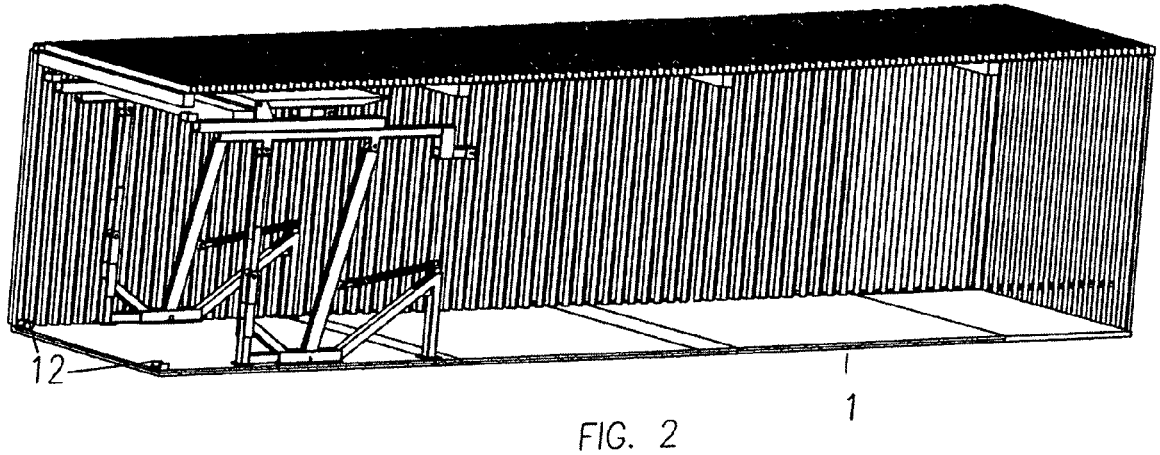
FIG. 2 depicts the invention with the protective walls removed, enclosed in a container with one container wall and the container door removed, wherein the invention is in a retracted and locked position.
Figure 5:
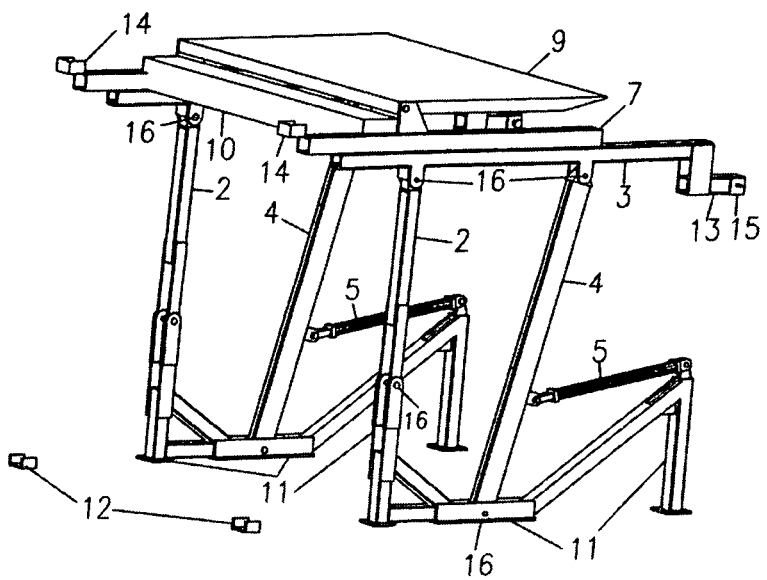
FIG. 5 depicts the invention with the protective walls removed and in a retracted and locked position with the container walls and doors removed.
Figure 6:
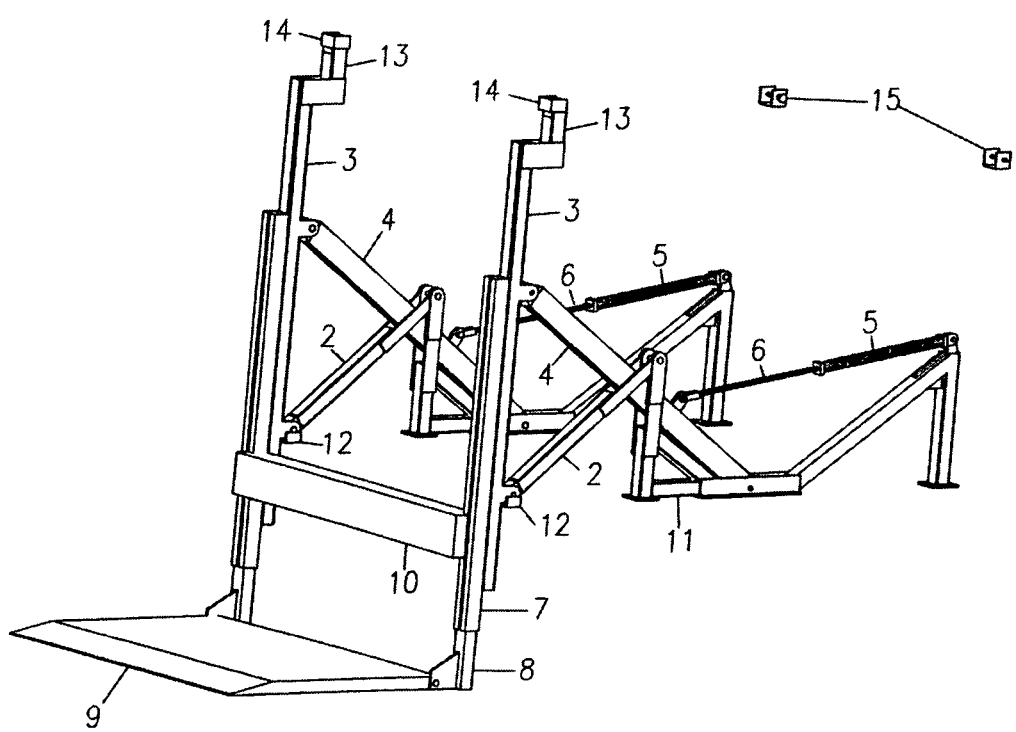
FIG. 6 depicts the invention with the protective walls removed and a deployed and locked position.

The present invention is a device and method of deploying a liftgate that is fully enclosed within the cargo space of a container. A schematic of the device according to an embodiment of the present invention is shown FIG. 5, in a nested state, and shown in FIG. 6, in a fully engaged state. As shown in FIGS. 5 and 6, the device includes dual anchor frames fixedly spaced apart 11, wherein each frame includes a front and rear support member and a series of connecting members and plates, a front linkage member 2 pivotably attached to the anchor frame 11, a rear linkage member 4 pivotably attached to the anchor frame, a linear actuator 5 pivotably attached to the rear linkage member and anchor frame, a mounting member pivotably attached to the front linkage member 2 and rear linkage member 3, and a liftgate 7,8,9 permanently attached to the mounting member. As seen in FIG. 1, the apparatus contains two protective walls 17. In another embodiment the front linkage member may pivotably attach to the actuator and become the driving linkage.

The anchor frame 11 comprises a rear support member and a front support member connected by a series of members and plates having a pivotal connection points.

Figure 3:
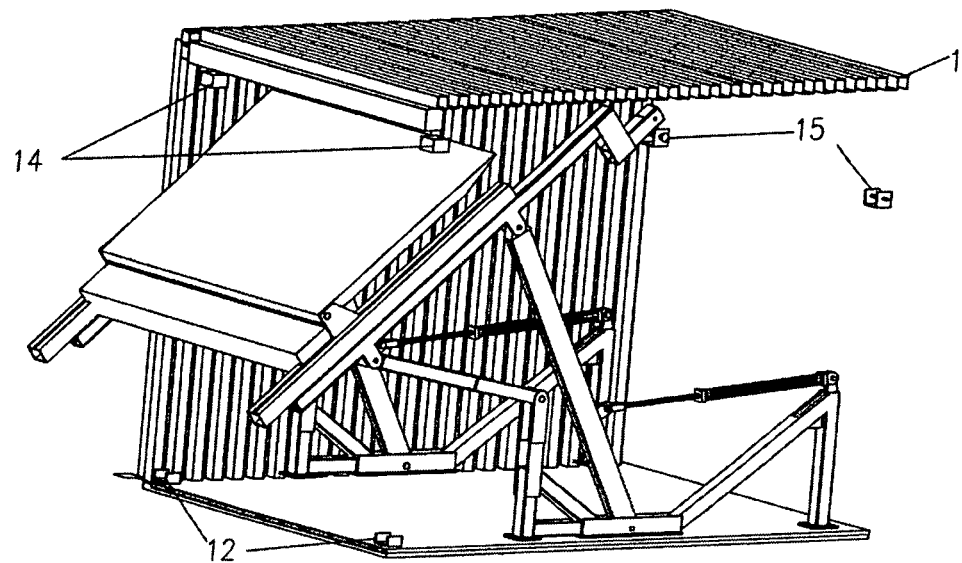
FIG. 3 depicts the invention with the protective walls removed, enclosed in a container with one container wall and the container door removed, wherein the invention is in semi-deployed state.
Figure 4:
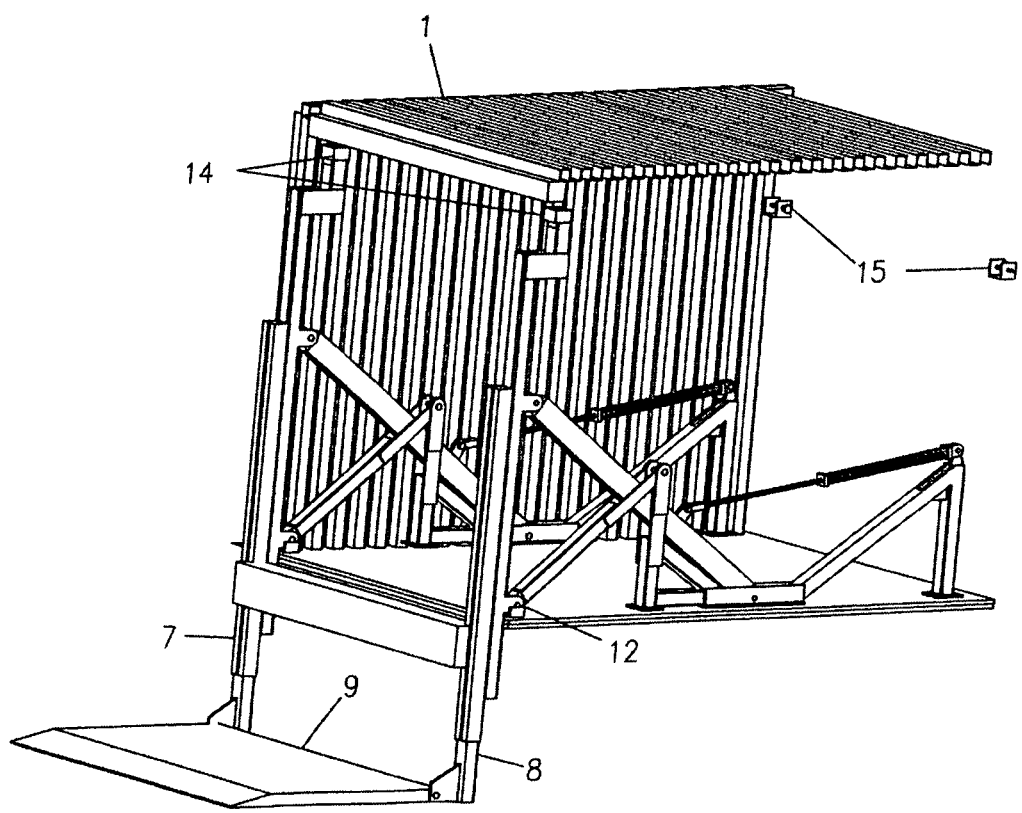
FIG. 4 depicts the invention with the protective walls removed, enclosed in a container with one container wall and the container door removed, wherein the invention is in a fully deployed state.

The front and rear support members are depicted in each Figure as rectangular, but may be of any shape. The front support member comprises a clevis permanently attached to the upper portion of the front support member. The front support member, rear support member, and series of members and plates are permanently fixed to the cargo space. FIG. 3 and FIG. 4 shows an embodiment of the invention in a nested and deployed state, respectively, with the anchor frame mounted on the floor wall of the front-end opening of a cargo container 1.

The apparatus is intended for use with a variety of liftgates and may therefore consist of a variety different material. The frame 11 is depicted as tubular but may be round, square, rectangular or any appropriate structural shape and may be a ferrous, non-ferrous or composite material. It may also be two sheets of ferrous or non-ferrous plate that are on opposite sides of the front linkage member and rear linkage member.

The front linkage member 2 is attached to the front support member of the anchor frame 11 at a pivot connection. The rear linkage 4 member is attached to the anchor frame at the pivotal connection point of the vertically elongate runner member 11. When in the nested position the rear member is locked into position 16.

The front linkage member 2 and rear linkage member 4 are depicted in all Figures as rectangular tube. However, the tube may also be round or square or any other appropriate structural shape and may be a ferrous, non-ferrous or composite material. In all Figures the front linkage member 2 and rear linkage member 4 are depicted as a beam but may be a plate, two plates, a truss configuration, or a crooked beam.

The front linkage member and rear linkage member are pivotably attached to the mounting member 3 at the other end. A liftgate 7, 8, & 9 is permanently fixed to the mounting member and the mounting member is the structural support member for the liftgate when the apparatus is in a fully deployed position. The mounting member comprises a mounting member and a tube extension 13 attached to the rear end of the mounting member 3. In a nested state, as in FIG. 5, the tube extensions are constrained by a locking device 15 fixed to the ceiling and/or sidewalls of the cargo container. In an engaged state, as in FIG. 4, the mounting member is constrained by a locking device 12 fixed to the floor and/or sidewall of the cargo container and a locking device 14 fixed to the sidewall and/or ceiling of the cargo container. Depending on the style of liftgate, the cross-brace 10 may be a component of the liftgate, as shown in all Figures. The cross-brace may also be permanently fixed to each mounting member.

In all Figures the mounting member 3 is shown as a square tube. However, the mounting member may be round, square, rectangular or any appropriate structural shape and may be a ferrous, non-ferrous or composite material. FIG. 1 depicts the mounting member as a stepped beam; however, it may be a plate, a series of built-up plates, a truss configuration, or a crooked beam.

In the nested configuration the liftgate is stowed in a locked position near the roof of the cargo unit. To deploy the liftgate, the storage locking devices 15 are unlocked and the hydraulic system pumps pressurized fluid to the hydraulic cylinders 5. The hydraulic cylinder rods 6 then extend, applying force to the rear linkage member 4, which begin to rotate downward. As depicted in FIG. 3, the front linkage member 2 simultaneously rotates and deploys concurrently with the rear linkage. When the cylinder rod is fully extended the apparatus is in a fully deployed position and the liftgate is repositioned from a nested position to a fully deployed and functional position just outside of the cargo container and is constrained from vertical and lateral movement by a lower locking device 12 and from lateral movement by the upper locking device 14.

The upper locking mechanism 12, and lower locking mechanism 14, shown in all Figures are U shaped brackets connected to the container. In the fully deployed state the mounting tube is locked into these locking mechanism by gravity and redundantly, by actuator pressure. The locks may also be a pin in a hole, angle shape in angled receiver, or a combination of the shapes. Any properly-sized locating/locking method would suffice. The locks may be a ferrous, non-ferrous or composite material.

The apparatus employs hydraulic cylinders to deploy the liftgate. However, the invention may also use electric actuators or pneumatic actuators to drive the four bar linkages and deploy the liftgate.

The pivots are hardened pins 16 in metal holes. They may also be a suitable shaft material with a plain, metallic or nonmetallic plain bearing or an antifriction bearing as well.

What is claimed is:

1. An apparatus to deploy a liftgate fully enclosed in a container space comprising:
   an anchor frame fixed to a container space wherein the anchor frame contains a rear support member and a front support member connected by a series of connecting members and plates and pivotal connection points;
      wherein the front support member of the anchor frame comprises an extension on each side of the front support member and a pivotal connection;
   a rear linkage member pivotably connected to one of the pivotal connection points of the anchor frame;
   an actuator pivotably connected to the anchor frame and rear linkage member;
   a front linkage member connected to the anchor frame wherein the front linkage member includes a pivot member having a first end, a pivot point, and a second end and a second pivot point;
   a mounting member pivotably attached to the front linkage member and rear linkage member;
      wherein the mounting member comprises a mounting member, pivotal connection points and an extension member;
   a liftgate attached to the mounting member; and
   a wall attached to the anchor frame;
      wherein in a nested state, the liftgate is stored in a locked, horizontal position above the anchor frame and front linkage member and rear linkage member;
      wherein in an engaged state, the mounting member and liftgate rotate to deploy the liftgate in a functional position outside the container space.

2. A method of deploying a liftgate within a fully enclosed space, comprising the steps of;
   providing a dual linkage system each including:
      an anchor frame fixed to a container space wherein the anchor frame contains a rear support member and a front support member connected by a series of members and plates and having pivotal connection points;
         wherein the front support member of the anchor frame comprises an extension on each side of the front support member and a pivotal connection point;
      a rear linkage member pivotably connected to the pivotal connection point of the anchor frame;
      an actuator pivotably connected to the anchor frame and rear linkage member;
      a front linkage member connected to the anchor frame wherein the front linkage member includes a pivot member having a first end, a pivot point, and a second end and a second pivot point;
      a mounting member, with two pivotal connection points, attached to the front linkage member and rear linkage member;
         wherein the mounting member comprises a member and an extension member;
      a liftgate attached to the mounting member;
      a wall attached to the anchor frame; and configuring the actuator to pivotably connect the frame and rear linkage member to alternatively pivot the liftgate in a functional position and a nested position.

3. The method of claim 2, further comprising placing the liftgate into an engaged state by extending the actuator such that the rear linkage member and front linkage member rotate downward to deploy the liftgate to the functional position outside of the container space.

4. The method of claim 3, further comprising storing the liftgate within the container space by retracting the actuator such that the rear linkage member and front linkage member rotate upward to retract the liftgate to return it to the nested position.

* * * * *